Dec. 3, 1929.   G. F. ZELLHOEFER   1,738,270
REFRIGERATING SYSTEM
Filed Nov. 10, 1925
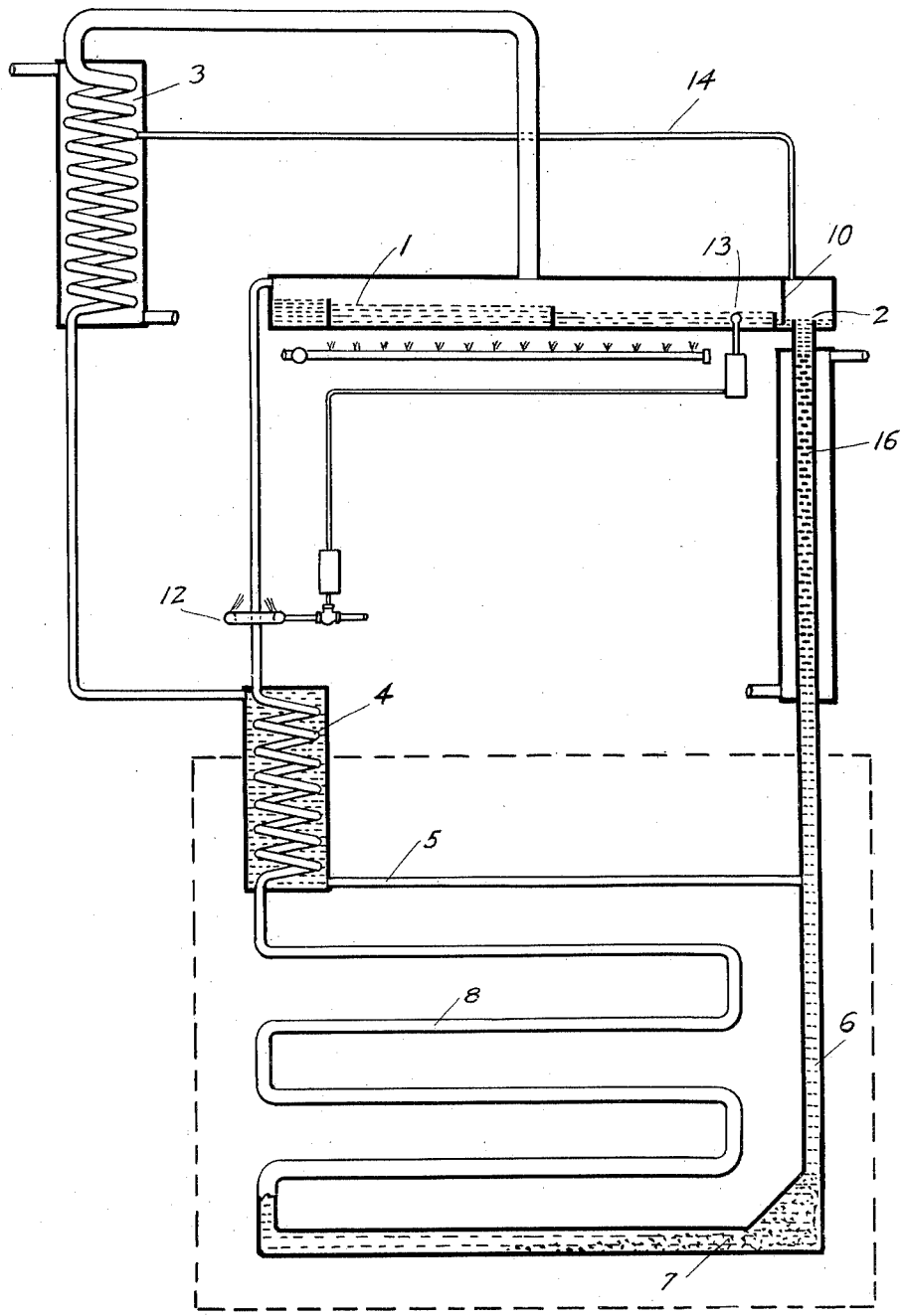
INVENTOR
Glenn F. Zellhoefer
BY
ATTORNEYS Patented Dec. 3, 1929

1,738,270

UNITED STATES PATENT OFFICE

GLENN FABER ZELLHOEFER, OF BLOOMINGTON, ILLINOIS

REFRIGERATING SYSTEM

Application filed November 10, 1925. Serial No. 68,083.

The invention relates to a refrigerating system and to a method of refrigerating. More specifically it relates to such a system or method wherein a cooling effect is produced by means of a salt having a negative heat of solution, that is, a salt which produces a chilling effect when dissolved in a solvent. Any salt which has a negative heat of solution may be employed and in the same manner any liquid that is a solvent for the salt employed may be used. Potassium sulphocyanate is a salt having a negative heat of solution and this being soluble in water, is given as an example of the use of a convenient salt and solvent.

Refrigerating systems as at present employed consist of ammonia plants used in ice making, or in the household devices operated by electricity and in which a gas such as sulphur dioxide is alternately compressed and expanded. In the use of such devices more or less of the gas may be lost, and the loss may decrease the efficiency of the plant and may also cause objectionable fumes in the atmosphere. Moreover, power such as electricity is not always available in all places where it is desired to install an iceless system of refrigeration.

The above objections to the systems now in use are well recognized and attempts have been made to overcome the same. So far as the inventor is aware the devices which have been constructed to overcome these objections have not heretofore been found practical.

An object of the present invention is to provide a method of and apparatus for refrigerating which avoids the use of ice or an expansible gas.

It is a further object to provide such a method and structure as will permit the use of a normally solid composition, such as a salt.

It is also an object of the invention to provide a method of refrigerating and an apparatus wherein a salt or mixture may be alternately dissolved and substantially dried, whereby a continuous cooling effect may be produced.

A further object of the invention is to provide that the drying operation may take place at a place more or less remote from the point where the refrigerating effect is exerted.

An embodiment of the invention is shown in the accompanying drawing which is a vertical section of an illustrative form of the apparatus.

In the drawing, as shown, the refrigerating compartment is represented by dotted lines. Any desired compartment may be employed, and the same does not form a part of the invention. While it may, in some instances, be desirable to include the whole assembly in a single housing, it is usually more convenient to arrange the heating and condensing means, to be described, at points external to the chamber as shown. As shown in the drawing, numeral 1 indicates a chamber in which the solution of the salt or salt mixture is placed and in which the drying operation is effected. Heat is applied to this chamber by any convenient means, a conventional burner being shown. An outlet 2 is provided for removal of the substantially water free salt, which salt will be melted by the heat and in a condition which will permit of its flowing. In the example given, potassium sulphocyanate, the melting point is about 160° C. A condenser 3 causes the condensation of the steam evolved from the vaporization of the water in the chamber 1. Further cooling of the condensed water is effected in a jacket enclosing the coils 4, the cooled water then flowing through the tubes or pipes 5, 6 and 7.

A chamber 16, shown as an extension of the pipe 6, is provided through which the salt or mixture drops from the outlet 2 and is delivered through pipe 6 to pipe 7. A water jacket is shown as surrounding the chamber 16. This chamber contains a mineral oil in about sufficient quantity to correspond in length to the length of the water jacket. In order to obtain the chilling effect, a pipe or coil 8 is set in the refrigerating compartment, this coil 8 being shown as a tortuous extension of the pipe 7 and also connected to the coil 4 above referred to. A flow circuit is thereby obtained which permits of the complete circulation of the refrigerating medium.

Baffle plates are shown in the chamber 1, these plates being of decreasing height from the inlet to the outlet end of the chamber. An additional baffle 10, situated near the outlet end, serves as a trap to prevent steam from reaching the cooling chamber 16. A tube 14 connects the outlet end, adjacent to the chamber 16, with the condenser 3 in order to equalize any difference in pressure as may arise on opposite sides of the baffle plate 10.

A source of heat is provided in order to effect or assist the circulation of the solution, any desired means, such as a burner 12, being employed. It is desirable that the heat applied to the chamber 1 be maintained at approximately the melting point of the salt or mixture employed. In the case of potassium sulphocyanate the melting point is about 160° C. In order to control the temperature, a thermostat 13 is placed in the chamber 1 and near the outlet end 2, this thermostat being set, in this case, for a range of temperature between 155°–160° C. and so regulating the heating effect of the burner 12, and thereby deliver the solution to the chamber 1 at about the temperature of the melting point of the salt.

A solution of potassium sulphocyanate is introduced in the system, the amount of water being substantially that as will not cause an overflow in the chamber 1 when the system is functioning. The burners are lighted and steam is evolved in the chamber 1. Such steam is conducted to the condenser 3 and therein condensed, the water so formed being returned through the water jacket surrounding the coil 4 and so to the pipe 7 as above described.

The vaporization of the water from the solution in the chamber 1 causes a concentration and a drying of the sulphocyanate solution. Instead of solidifying, the salt is retained in a liquid state by reason of the fact that the temperature maintained is that of the melting point of the salt. This salt, in a liquid state, is carried off by the outlet 2 and drops into the mineral oil in the chamber 16. As this column of oil is cooled by the surrounding water jacket, the temperature is low enough to cause the solidification of the salt which drops into the pipes 6 and 7. Here the salt redissolves in the water, returned from pipe 5, and in going into solution gives up its heat and thereby produces a refrigerating action.

The heat applied by the burner 12 both aids in the circulation of the solution and raises the temperature to a point where the water will readily vaporize on entering the chamber 1. It will, therefore, be apparent that a complete and continuous circulating system has been provided and that the salt, being alternately solidified and dissolved, is continuously available to produce a refrigerating effect.

The process can be carried out without sacrificing all the advantages of the invention by regulating heat applied to the system at one or more points so that instead of drying the salt the solution is merely concentrated to a point where some of the salt separated out and the resulting mixture passes around to the refrigerating zone.

It is apparent that changes may be made in the apparatus which is shown for illustrative purposes only, and I wish to limit the scope of my invention only by the appended claims.

Having described my invention, what I desire to claim and secure by Letters Patent is:

1. A method of refrigerating which comprises, dissolving a solute in a solvent, conveying the solution so formed to a recovery chamber, applying heat to the solution to cause substantially complete separation of the solute from the solvent, the heat being sufficient to maintain the solute in a molten state, and returning the solute to effect a redissolution.

2. A method of refrigerating which comprises, dissolving a solute in a solvent, conveying the solution so formed to a recovery chamber, applying heat to the solution to cause substantially complete separation of the solute from the solvent, the heat being sufficient to maintain the solute in a molten state, separately conveying off the solute and the solvent, and re-uniting the solute and the solvent to effect a re-dissolution.

3. A method of refrigerating which comprises, dissolving a solute in a solvent, conveying the solution so formed to a separating chamber, heating said chamber to a degree sufficient to effect the evaporation of the solvent and the melting of the solute, maintaining the solute in a melted state while in the chamber, causing the melted solute to flow from the chamber, cooling said solute to effect solidification of the same, separately condensing the solvent and re-uniting the condensed solvent and the solidified solute to effect a repetition of the method.

4. A method of refrigerating which comprises, dissloving a solute in a solvent to produce a refrigerating effect, conveying the solution so formed to a separating chamber, heating the solution between controlled limits during such conveyance, further heating the solution to effect vaporization of the solvent and the melting of the solute, cooling the solute in a mineral oil to effect solidification, condensing the vaporized solvent and re-uniting the solute and the solvent to effect a redissolution.

5. A continuously cycling refrigerating unit including a solvent and a solute having a melting point above the boiling point of the solvent and adapted to form a refrigerating solution therewith, comprising means for containing the refrigerating solution, means for carrying off the said solution, heating means for separating the solute and solvent and reducing the solute to a molten state, means for solidifying the molten solute including a liquid bath, and means for returning the separated solute and solvent to the first mentioned means.

6. A continuously cycling refrigerating unit including a solvent and a solute having a melting point above the boiling point of the solvent and adapted to form a refrigerating solution therewith, comprising a container for the refrigerating solution, a separating chamber, means for delivering the solution from said container to said chamber, means for applying sufficient heat to said chamber to vaporize the solvent and melt the remaining solute, means for removing the vaporized solvent from said chamber, condensing it and returning the condensed solvent to the container, and means for removing the molten solute from said chamber, solidifying it by immersion in a liquid and returning the solidified solute to the container.

7. A continuously cycling refrigerating unit including a solvent and a solute having a melting point above the boiling point of the solvent and adapted to form a refrigerating solution therewith, comprising a container for the refrigerating solution, a separating chamber, a delivery pipe from said container to said chamber, means for conveying the solution therethrough from said container to said chamber, means for applying sufficient heat to said chamber to vaporize the solvent and melt the remaining solute, a pipe leading from said chamber, a condenser in said pipe and a discharge therefrom into said chamber for returning the separated and condensed solvent thereto, and means for returning the molten solute from said chamber as a solid to said container comprising a column of liquid adapted to solidify the molten solute interposed between said chamber and said container, means for dropping the molten solute from the chamber into said liquid, and means for discharging the solidified solute from said liquid into said container.

8. A refrigerating apparatus of the character described, comprising a refrigerating device in which the cold solution is received for the absorption of heat, a concentrator, a crystallizer and dissolver in which the salt is crystallized out of the solution and is dissolved, means to conduct the concentrated solution from the concentrator to the crystallizer and dissolver, means to condense the vapor from the concentrator and conduct the water of condensation to the dissolver to dissolve the salt therein, and means to return the solution from the dissolver to the concentrator, the concentrator being in such position with respect to the crystallizer and dissolver that the weight of the column of liquid between the concentrator and the bottom of the dissolver is equal to the weight of the column of returning solution between the dissolver and the concentrator.

In testimony whereof I affix my signature.
GLENN FABER ZELLHOEFER.